(12) United States Patent
Ispas et al.

(10) Patent No.: US 11,177,892 B1
(45) Date of Patent: Nov. 16, 2021

(54) METHOD OF ANALYZING A PERIODIC HORIZONTAL IMPAIRMENT COMPONENT AND MEASUREMENT INSTRUMENT

(71) Applicant: Rohde & Schwarz GmbH & Co. KG, Munich (DE)

(72) Inventors: Adrian Ispas, Munich (DE); Julian Leyh, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/881,972

(22) Filed: May 22, 2020

Related U.S. Application Data

(63) Continuation-in-part of application No. 15/931,153, filed on May 13, 2020.

(51) Int. Cl.
    *H04B 17/29* (2015.01)
(52) U.S. Cl.
    CPC .................... *H04B 17/29* (2015.01)
(58) Field of Classification Search
    CPC .......................... H04B 17/29; G01R 31/31709
    See application file for complete search history.

(56) References Cited

U.S. PATENT DOCUMENTS

| | | | | |
|---|---|---|---|---|
| 7,388,937 B1* | 6/2008 | Rodger | ................... | H04L 1/205 375/346 |
| 2006/0178850 A1* | 8/2006 | Kobayashi | ......... | G01R 13/0254 702/89 |
| 2008/0004821 A1* | 1/2008 | Cranford, Jr. | .... | G01R 31/31709 702/69 |
| 2010/0107009 A1* | 4/2010 | Yamaguchi | ...... | G01R 31/31709 714/26 |
| 2010/0189208 A1* | 7/2010 | Fudge | ................... | H04L 7/0083 375/371 |

* cited by examiner

*Primary Examiner* — David B Lugo
(74) *Attorney, Agent, or Firm* — Christensen O'Connor Johnson Kindness PLLC

(57) ABSTRACT

A method of analyzing at least one periodic horizontal impairment component of an input signal is described. The input signal is received that includes at least a periodic horizontal impairment component. The at least one periodic horizontal impairment component is analyzed based on a first model, thereby obtaining a first estimated parameter set for each analyzed periodic horizontal impairment component. The at least one periodic horizontal impairment component is analyzed based on a second model, thereby obtaining a second estimated parameter set for each analyzed periodic horizontal impairment component. The first model is different to the second model. Further, the present disclosure provides a measurement instrument.

20 Claims, 3 Drawing Sheets

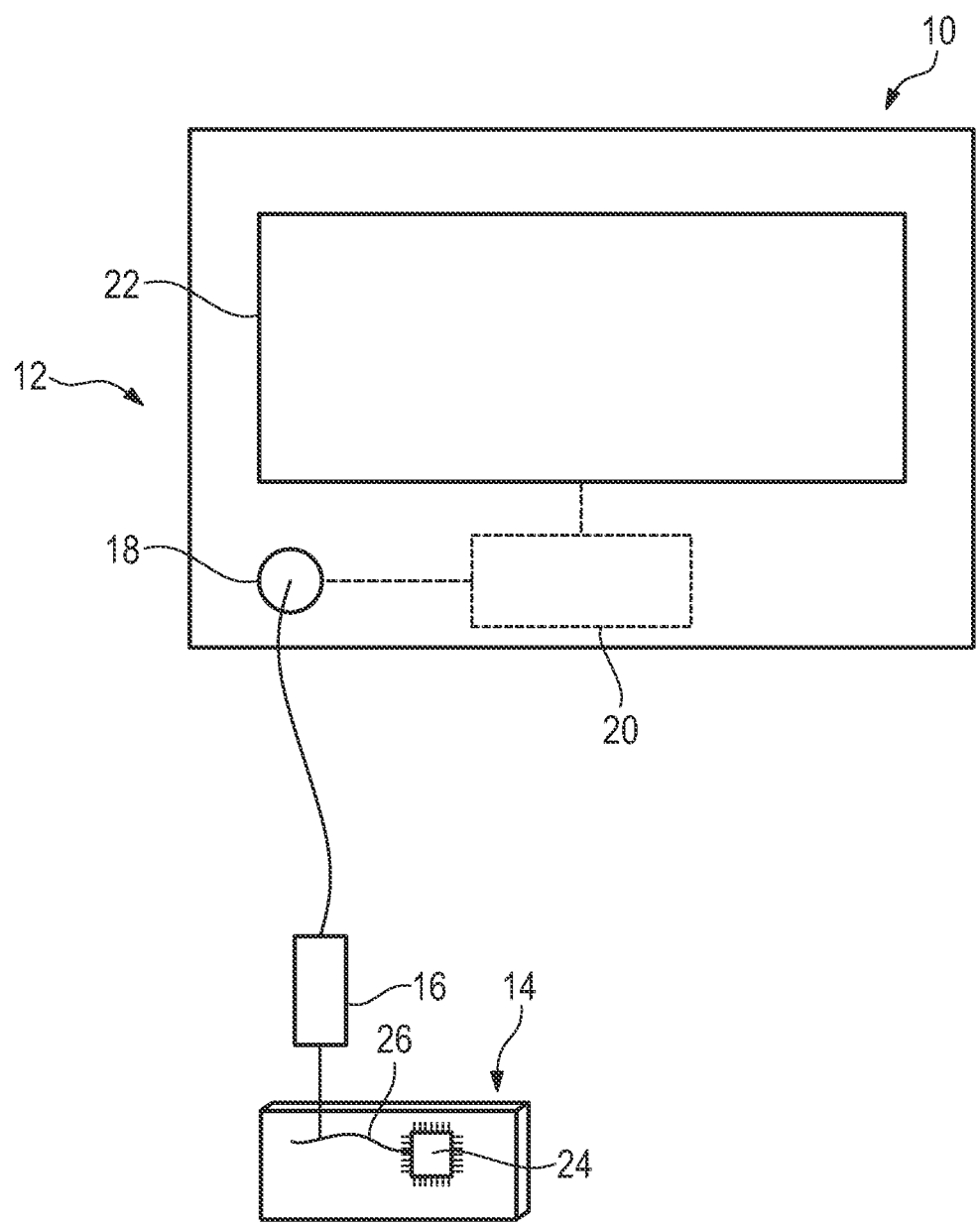
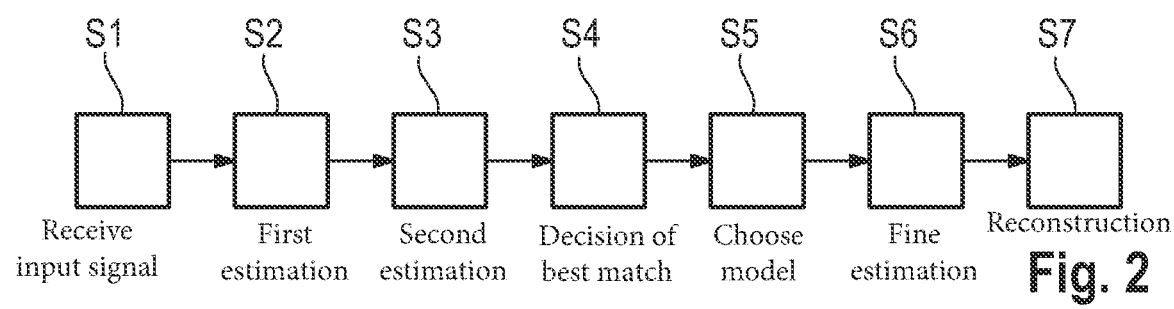

METHOD OF ANALYZING A PERIODIC HORIZONTAL IMPAIRMENT COMPONENT AND MEASUREMENT INSTRUMENT

CROSS-REFERENCE TO RELATED APPLICATION

This application is a continuation-in-part of U.S. patent application Ser. No. 15/931,153, filed May 13, 2020, the disclosure of which is incorporated herein by reference in its entirety.

FIELD OF THE DISCLOSURE

Embodiments of the present disclosure generally relate to a method of analyzing a periodic horizontal impairment component of an input signal. Further, embodiments of the present disclosure generally relate to a measurement instrument for analyzing a periodic horizontal impairment component of an input signal.

BACKGROUND

In advanced jitter and noise analysis of an input signal, also known as jitter and noise decomposition, high-speed serial signals are processed by a measurement instrument, for instance an oscilloscope, in order to extract measures for signal integrity of the input signal. One of these measures corresponds to amplitudes and frequencies of so-called periodic horizontal impairment components that shift the symbol timing, therefore horizontal, by an amount that varies periodically in time, therefore periodic.

It is known in the state of the art that periodic horizontal impairment components can be described by sums of sine waves. So far, techniques are known that estimate the periodic horizontal impairment components by measuring the amount by which each timing of a data edge is off from a reference clock, also known as Time Interval Error (TIE) of the Total Jitter (TJ), and looking for sinusoidal trends within the data obtained commonly by applying a transform on the respective TIE values, for instance a Fast-Fourier-Transform (FFT).

However, it turned out that the accuracy of the respective estimation depends on the source of the periodic impairment component, mathematically described as the respective time base of the periodic horizontal impairment component.

Accordingly, there is a need for a fast and reliable possibility to analyze a periodic horizontal impairment component of an input signal.

SUMMARY

Embodiments of the present disclosure provide a method of analyzing at least one periodic horizontal impairment component of an input signal. In an embodiment, the method comprises the steps of:

Receiving the input signal that comprises at least a periodic horizontal impairment component, Analyzing the at least one periodic horizontal impairment component based on a first model, thereby obtaining a first estimated parameter set for each analyzed periodic horizontal impairment component, and Analyzing the at least one periodic horizontal impairment component based on a second model, thereby obtaining a second estimated parameter set for each analyzed periodic horizontal impairment component, wherein the first model is different to the second model.

Further, embodiments of the present disclosure provide a measurement instrument for analyzing a periodic horizontal impairment component of an input signal. In an embodiment, the measurement instrument comprises at least one input channel and an analysis circuit or module being connected to the at least one input channel. The measurement instrument is configured to receive an input signal comprising at least a periodic horizontal impairment component via the input channel and to forward the input signal to the analysis module. The analysis module is configured to analyze the periodic horizontal impairment component based on a first model, thereby obtaining a first estimated parameter set for each analyzed periodic horizontal impairment component. The analysis module is configured to analyze the periodic horizontal impairment component based on a second model, thereby obtaining a second estimated parameter set for each analyzed periodic horizontal impairment component. The first model is different to the second model.

Accordingly, the periodic horizontal impairment component is analyzed by applying two different models for analyzing the respective periodic horizontal impairment component of the input signal. In some embodiments, the first model and the second model are associated with different time bases, namely a symbol time base and a sample time base.

The respective analysis of the periodic horizontal impairment component is based on an estimation, for example at least a coarse or rather rough estimation. In other words, the respective analysis, namely the analysis based on the first model or the analysis based on the second model, corresponds to a coarse estimation.

Accordingly, the periodic horizontal impairment component, for instance parameters associated therewith, are estimated in two different ways since the first model and the second model are used for analyzing purposes, thereby generating the first analysis and the second analysis, for example the first coarse estimation and the second coarse estimation.

The first model may be a symbol time based model, wherein the second model may be a sample time based model.

As mentioned above, each periodic impairment component can be described by a sum of sine waves.

Therefore, the first model may describe the influence of a single periodic horizontal impairment component by $$A \cdot \sin(k \cdot T_s \cdot f + \Phi),$$

with symbol index k and the respective model parameters, namely amplitude A, frequency f and initial phase $\Phi$ of the respective periodic horizontal impairment component. In addition, the nominal symbol period $T_s$ is used, namely the expected time that passes between two symbols.

The second model may describe the influence of a single periodic horizontal impairment component differently, namely by $$A \cdot \sin(T(k) \cdot f + \Phi),$$

with T(k) corresponding to the recovered symbol time of symbol k, for example by a clock data recovery (CDR).

In an ideal scenario, namely a scenario without any transmitter frequency deviations, the frequency of a transmitter, namely the one of a device under test, is exactly equal to its nominal frequency and it never fluctuates. Therefore, the expected symbol time T(k) is equal to the term $k \cdot T_s$. In other words, both models provide identical estimations in the ideal scenario.

In case of a constant frequency offset, the expected symbol time corresponds to $T(k)=k \cdot (T_s+\Delta T_s)$. The estimated frequency of the periodic component in the second model corresponds to $$f_{smp} = f_{sym} \cdot \frac{T_s}{T_s + \Delta T_s}$$

with $f_{sym}$ being the frequency provided by the first model and $f_{smp}$ being the frequency provided by the second model. Hence, the amplitude is the same in both models, but the frequency differs slightly.

In a Spread Spectrum Clocking (SSC) scenario, the clock of the transmitter, namely the one of the device under test, is continuously modulated such that the equivalent $\Delta T_s$ changes throughout the acquisition. This behavior cannot be expressed by a simple change in frequency or amplitude of one periodic component. Instead, the power of the respective periodic component is distributed over a certain frequency range. Accordingly, no single peak in a transform, for example in a Fast Fourier Transform (FFT), provides the true value due to the power distribution over the certain frequency range. The respective transform is typically performed when analyzing the periodic horizontal impairment component, for example by any of the models described above.

The SSC scenario is a common scenario. In some embodiments, both models described above may provide correct results for signals with the respective impairments. There are signals that have periodic horizontal components that follow the first model. However, there are also other signals with periodic horizontal impairment components that follow the second model. Moreover, there are also signals which have both types of periodic horizontal impairment components. In order to get good analysis results, both models have to be considered.

In general, the periodic horizontal impairment components following the first model follow any symbol rate deviation of the transmitter of the input signal, namely the device under test issuing the input signal. As shown above, the respective first model is completely unaware of any rate deviation of the transmitter. Therefore, it is assumed that the position of each of these originally equidistant samples is exactly at the symbol times. The samples may be stretched apart or pushed together, thus following the symbol rate. Therefore, the first model is associated with the symbol time base.

In this regard, it is to be noted that periodic horizontal impairment components which come from the transmitter itself may be locked to the oscillator of the transmitter or even be part of the oscillator. Hence, these periodic horizontal impairment components follow the clock of the transmitter and, thus, they are intrinsic ones. Put differently, the source of those periodic horizontal impairment components is an intrinsic source. Therefore, these periodic horizontal impairment components can be modelled according to the symbol time base.

In addition, periodic horizontal impairment components following the second model do not follow any symbol rate deviation of the transmitter of the input signal, namely the device under test issuing the input signal. The sine function in the second model is sampled at exactly the time instances where they are later assumed to be (i.e. the symbol times). Therefore, the sine wave itself has actually a constant frequency across the acquisition. Hence, the second model is associated with the sample time base.

In this regard, it is to be noted that periodic horizontal impairment components which are triggered by external interference sources, such as sinusoidal modulation of the operating voltage of the transmitter, are not "locked" to the oscillator of the transmitter and therefore they do not track its frequency. These components are extrinsic ones or, in other words, their source is an extrinsic source. In some embodiments, these components have a sample time base effect and, therefore, these periodic horizontal impairment components can be modelled according to the sample time base.

According to an aspect, it is decided whether the model associated with the first analysis of the periodic horizontal impairment component or the model associated with the second analysis of the periodic horizontal impairment component best meets a pre-defined criterion. It is checked which of the models fulfills the respective pre-defined criterion most likely such that a clear decision between the first model or the second model can be obtained for the respective periodic horizontal impairment component. Then, the respective model providing the better estimation can be used for further processing. In other words, the result does not correspond to a mixture of both models for an individual component since only one of the models is used. In general, a clear separation of the results provided by both models is done.

For instance, the decision is made automatically without any manual input. The decision can be made by a processor, for example the analysis module, of the measurement instrument. Hence, the processor or rather the analysis module automatically applies the different models in order to analyze the periodic horizontal impairment component at least roughly.

Further, the pre-defined criterion may relate to a maximum value or a minimum value. The minimum value may correspond to the lowest reconstruction error when reconstructing the periodic horizontal impairment component by the first model and the second model. Hence, the respective reconstruction errors may be determined and taken into consideration in order to identify the lowest one. Alternatively, the pre-defined criterion may relate to a maximum value such as the highest value in a transform, for instance a Fast Fourier Transform (FFT).

In addition, the model associated with the reconstruction of the periodic horizontal impairment component may be chosen for further processing that best meets the pre-defined criterion. In other words, the respective model, namely the first model or the second model, can be used for further processing, for instance a fine estimation in order to reconstruct the periodic horizontal impairment component more accurately.

In some embodiments, the respective model for each component is chosen automatically without any manual input. The respective choice may be done by a processor, for instance the analysis module, of the measurement instrument. Hence, the processor or rather the analysis module automatically applies the different models in order to estimate the periodic horizontal impairment component at least roughly.

Further, the processor or rather the analysis module automatically compares representations of the respective estimations with the pre-defined criterion in order to decide whether the first estimation of the periodic horizontal impairment component or the second estimation of the periodic horizontal impairment component best meets the pre-defined criterion. Then, the model associated with the respective estimation best meeting the pre-defined criterion is selected automatically for further processing.

In addition, the model associated with the analysis chosen may be indicated to a user and/or displayed on a display. Therefore, the user is informed about the respective model applied for analyzing the respective periodic horizontal impairment component. As mentioned above, the operator or rather user can derive certain information from the best matching model since the models provide information concerning the source of the impairment, namely the periodic horizontal impairment component. In some embodiments, the user can derive the information whether the impairment comes from within the device under test itself (intrinsic impairment) or likely from outside the device under test (extrinsic impairment), which may be helpful in debugging the respective signal. However, the extrinsic impairment may also come from inside of the device under test provided that the impairment is uncoupled from clock generation. In general, the user obtains an indication of the time basis of the individual periodic horizontal impairment component.

A source of the periodic horizontal impairment component may be indicated. The respective source of the impairment may be indicated directly rather than indirectly by indicating the respective time base. Hence, the user does not have to know which model concerns which kind of source. In general, the user obtains an indication of the presumed origin of the individual periodic horizontal impairment component.

In some embodiments, it is indicated whether the source of the periodic horizontal impairment component is an intrinsic source or an extrinsic source. In other words, it is indicated whether the impairment comes from within the device under test or likely from outside the device under test.

The source of the periodic horizontal impairment component may be derived from the model associated with the respective analysis. As mentioned above, the model that best matches the pre-defined criterion provides information with regard to the source of the impairment. This relation may be taken into consideration by the processor or rather the analysis module automatically such that the respective source of the periodic horizontal impairment component may be indicated to the user and/or displayed on a display.

Another aspect provides that the respective analysis comprises a coarse estimation of the periodic horizontal impairment component. The coarse estimation may also be called rough estimation such that the periodic horizontal impairment component is roughly estimated. This applies for the first model as well as the second model which means that coarse estimations are done according to the first model and the second model. Generally, the coarse estimation is a spectrum-based one.

For instance, the coarse estimation is based on a transform of a time interval error (TIE) vector. The vector of the time interval errors is used as an input for the transform, wherein the respective time interval errors for the different symbols are obtained by known techniques. For instance, a clock data recovery (CDR) is done in order to gather the respective time interval errors (TIE). The respective time interval errors (TIE) gathered are reformulated as a vector, obtaining the time interval error (TIE) vector. Then, a (windowed) Fast Fourier Transform (FFT) may be performed, thereby generating the Fourier transform of the time interval errors, namely a respective spectrum, which is used for the coarse estimation.

Moreover, an interpolation may be applied in order to fill any gaps of missing edges or rather symbols, resulting in a complete time interval error (TIE) vector. Alternatively a non-uniform transform may be applied instead of gap filling.

According to another aspect, the coarse estimation may comprise the step of identifying peaks in a spectrum associated with the input signal, wherein the spectrum is obtained by a transform, for instance a Fast Fourier Transform (FFT). As mentioned above, the spectrum may be obtained by performing the windowed FFT on the TIEs that are obtained by performing the clock data recovery (CDR) on the input signal. Hence, the spectrum is associated with the input signal. The position of the peaks in the transform may be identified by using a simple maximum detector. For each peak detected, the respective frequency and phase are determined. The frequency and the phase obtained by the coarse estimation may be used for a further processing, for example a fine estimation of the periodic horizontal impairment component.

The coarse estimation of the periodic horizontal impairment component when applying the second model may comprise a resampling step or a non-uniform transform. The resampling step may be performed before running the transform. In some embodiments, the vector of the time interval errors is obtained as a result of sampling the input signal, namely a continuous time function, at times provided by the clock data recovery (CDR). This means that the respective time interval errors obtained are actually non-uniformly sampled values that are taken from a continuous function. Accordingly, the respective function may be resampled at resampling times, namely on a uniform grid. Alternatively, a non-uniform transform may be applied instead of resampling.

Generally, the analysis performed according to the first model and the analysis performed according to the second model may each comprise at least a coarse estimation.

Another aspect provides that a fine estimation of the periodic horizontal impairment component is performed. The fine estimation provides the model parameters of the respective model applied in a more accurate manner compared to the coarse estimation, for example the amplitude, the frequency and/or the initial phase.

Generally, the fine estimation may only be performed for the respective model that best meets the pre-defined criterion.

The fine estimation may be based on a substitute model that is linearized. Thus, linear regression analysis techniques may be applied in order to determine the respective model parameters associated with the model, for example the signal parameters associated with periodic functions, based on the input signal.

A further aspect provides that a coarse estimation of the periodic horizontal impairment component is performed previously, thereby obtaining at least a roughly estimated frequency and a roughly estimated initial phase of the periodic horizontal impairment component. The fine estimation takes the roughly estimated frequency and the roughly estimated initial phase of the periodic horizontal impairment component into account in order to determine at least one of an amplitude, a frequency and an initial phase of the periodic horizontal impairment component. The amplitude, the frequency and/or the initial phase of the periodic horizontal impairment component determined by the fine estimation corresponds to the real values of the periodic horizontal impairment component in a more accurate manner compared to the rough or rather coarse estimation performed previously.

In some embodiments, the fine estimation may be based on a least squares approach. Hence, a least squares problem is generated that is solved efficiently by a standard least squares solver known in the state of the art. When solving the respective least squares problem, the model parameters are gathered that correspond to the amplitude, the frequency and the initial phase to be recovered in order to recover the periodic horizontal impairment component in an accurate manner.

In general, the quality of the analysis is improved by considering at least two different models, namely two different time basis that are associated with the different models used for analyzing purposes. The frequencies and amplitudes are more accurately estimated when the periodic horizontal impairment component is analyzed with the correct time base. The improved quality of the reconstruction also affects most results of the jitter and noise analysis, namely the further processing.

Generally, the estimations could be arranged in a different order. For instance, the fine estimation may be run for both models, wherein one of the models is selected afterwards. Moreover, the fine estimation and the coarse estimation may also be done in a single estimation step.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows a measurement system with the measurement instrument according to an embodiment of the present disclosure;

FIG. 2 shows a flow-chart illustrating a method of analyzing a periodic horizontal impairment component of an input signal according to an embodiment of the present disclosure;

DETAILED DESCRIPTION

Figure 3:
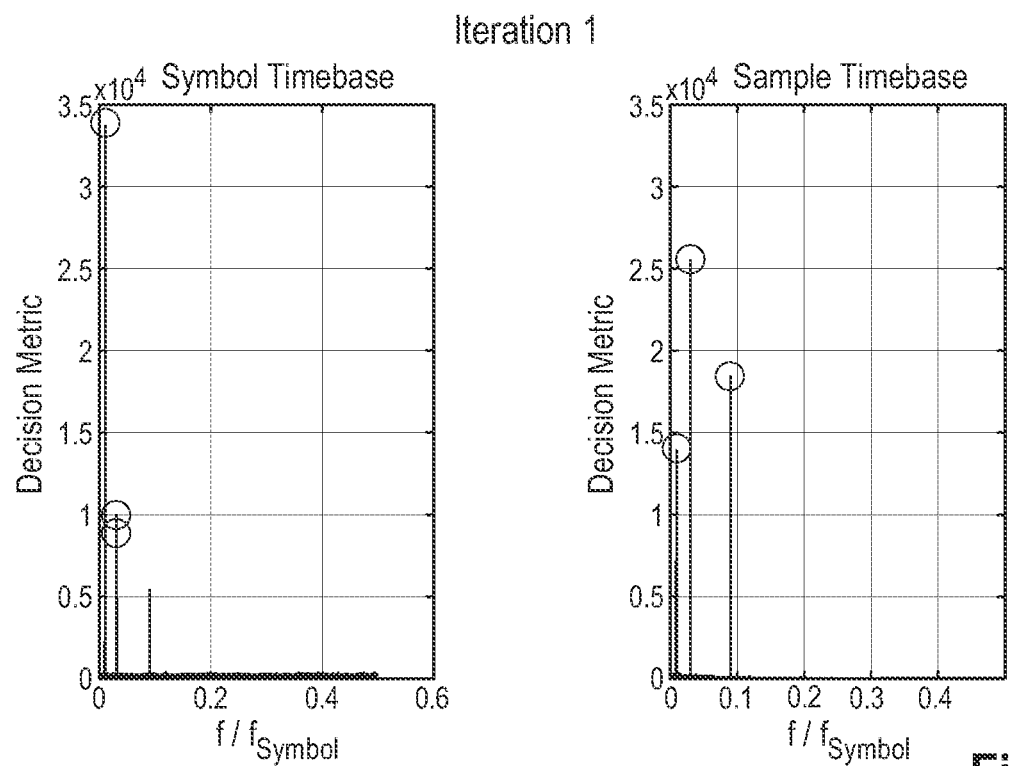
FIG. 3 shows an overview of a coarse estimator decision metrics in a first iteration.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 schematically shows a measurement system 10 comprising a measurement instrument 12 and a device under test 14. The measurement instrument 12 comprises a probe 16, an input channel 18, an analysis circuit or module 20 and a display 22.

The probe is connected to the input channel 18, which in turn, is connected to the analysis module 20. The display 22 is connected to the analysis module 20 and/or to the input channel 18 directly. In an embodiment, a housing is provided that encompasses at least the analysis module 20.

In general, the measurement instrument 12 may be established as an oscilloscope, a spectrum analyzer, a vector network analyzer or any other kind of measurement device that is configured to measure certain properties of the device under test 14.

The device under test 14 comprises a signal source 24, also called transmitter, as well as the transmission channel 26 connected to the signal source 24. In general, the signal source 24 is configured to generate an electrical signal that propagates via the transmission channel 26. In some embodiments, the device under test 14 comprises a signal sink to which the signal generated by the signal source 24 propagates via the transmission channel 26.

For example, the signal source 24 generates the electrical signal that is then transmitted via the transmission channel 26 and probed by the probe 16, for example a tip of the probe 16. In some embodiments, the electrical signal generated by the signal source 24 is forwarded via the transmission channel 26 to a location where the probe 16, for example its tip, can contact the device under test 14 in order to measure the input signal.

Thus, the electrical signal may generally be sensed between the signal source 24 and the signal sink assigned to the signal source 24, wherein the electrical signal may also be probed at the signal source 24 or the signal sink directly. Put another way, the measurement instrument 12, for example the analysis module 20, receives an input signal via the probe 16 that senses the electrical signal.

The input signal probed is forwarded to the analysis module 20 via the input channel 18. The input signal is then processed and/or analyzed by the analysis module 20 in order to determine the properties of the device under test 14. Therein and in the following, the term "input signal" is understood to be a collective term for all stages of the signal generated by the signal source 24 that exist before the signal reaches the analysis module 20. In other words, the input signal may be altered by the transmission channel 26 and/or by other components of the device under test 14 and/or of the measurement instrument 12 that process(es) the input signal before it reaches the analysis module 20. Accordingly, the input signal relates to the signal that is received and analyzed by the analysis module 20.

The input signal may comprise at least a periodic horizontal impairment component that shifts the symbol timing of the signal source 24 by an amount, yielding a horizontal displacement, wherein this shift periodically varies in time, yielding the periodic impact on the impairment component.

As shown in FIG. 2, the measurement instrument 12 is generally configured to perform a method of analyzing the periodic horizontal impairment component of the input signal as will be described hereinafter.

In a first step S1, the input signal that comprises the periodic horizontal impairment component is received by the analysis module 20 of the measurement instrument 12. As described above, the input signal may be pre-processed by the device under test 14 itself and/or a front end of the measurement instrument 12, for example the respective channels 18, 26. In some embodiments, symbol clock times may be derived from the input signal by a clock data recovery (CDR).

In a second step S2, the periodic horizontal impairment component is estimated based on a first model in a coarse manner, thereby obtaining a first estimate of the periodic horizontal impairment component. The first estimate corresponds to a first estimated parameter set for each analyzed periodic horizontal impairment component.

In a third step S3, the periodic horizontal impairment component is analyzed based on a second model in a coarse manner, thereby obtaining a second estimate of the periodic horizontal impairment component. The second estimate corresponds to a second estimated parameter set for each analyzed periodic horizontal impairment component.

In some embodiments, the first model and the second model are different from each other such that different models are used for analyzing the periodic horizontal impairment component. The first model is a symbol time based model, whereas the second model is a sample time based model.

This means that the first model is based on the following equation for describing a single periodic horizontal impairment component:

$$A \cdot \sin(k \cdot T_s \cdot f + \Phi),$$

with symbol index k and the respective model parameters, namely amplitude A, frequency f and initial phase $\Phi$ of the respective periodic horizontal impairment component.

In contrast, the second model uses the following equation for describing a single periodic horizontal impairment component:

$$A \cdot \sin(T(k) \cdot f + \Phi),$$

with T(k) corresponding to the symbol time of symbol k recovered by the CDR.

In a fourth step S4, it is decided whether the model associated with the first analysis or the model associated with the second analysis best meets a pre-defined criterion, for instance a maximum value or a minimum value. This respective decision can be made automatically without any manual input by the analysis module 20.

The coarse estimation is based on a vector of time interval errors (TIEs) that may be obtained by a clock data recovery. The vector of time interval errors for N samples can be described as follows:

$$J_{TIE} = [TIE_0, TIE_1, \ldots, TIE_N]$$

Further, a resampling may take place for the respective coarse estimation such that the time interval errors are transformed on a uniform grid provided by the resampling.

In some embodiments, the vector of time interval errors corresponds to a result of sampling a continuous time function at times $T_{CDR} = [T_0, T_1, \ldots, T_N]$. This means that the TIEs are actually non-uniformly sampled values taken from a continuous function.

Accordingly, the function is resampled at times $T_{Resample} = [0 \cdot T_S, 1 \cdot T_S, \ldots N \cdot T_S]$, namely on a uniform grid. For this purpose, adjacent TIEs are used for a linear interpolation.

The vector of the time interval errors is used as an input on which a windowed Fast Fourier Transform (FFT) is performed in order to obtain the respective spectrum.

Then, the position of peaks in the spectrum can be identified by using a simple maximum detector. For each peak identified, the respective frequency and phase are determined which can be used in a subsequent fine estimation as will be described hereinafter.

In a fifth step S5, the model that best meets the pre-defined criterion is chosen for further processing. Hence, the model is selected that fulfills the pre-defined criterion most likely. This can also be down automatically by the analysis module 20.

For instance, a certain periodic horizontal impairment component from all horizontal impairment components esti-mated roughly by both models is selected for further processing. This is shown in more detail in FIG. 3 since the respective coarse estimations, for example the respective decision metrics, are shown for both models indicated by symbol time base and sample time base, respectively.

In the respective decision metrics, three different periodic horizontal impairment components, namely three different impairments, are illustrated that provide different values. Obviously, the one with the lowest frequency shown in the symbol time base, namely the first model, has the highest value or rather the maximum value from all peaks shown. The highest value corresponds to the pre-defined criterion that is used to identify the respective model used for further processing.

Accordingly, the first model is selected for this specific periodic horizontal impairment component as this model yields the largest amplitude or rather the largest value for the specific periodic horizontal impairment component.

In a sixth step S6, a fine estimation of the respective periodic horizontal impairment component identified previously by the coarse estimation is performed.

The respective model associated with the result of the coarse estimation is also taken into account for the fine estimation. Accordingly, the periodic horizontal impairment component is estimated in a more accurate manner.

In some embodiments, the fine estimation takes the respective frequency and the respective initial phase from the coarse estimation performed previously into account.

The respective substitute model mentioned above is used wherein the model is linearized for estimation purposes.

The linearization ensures that a linear model can be constructed as shown hereinafter while using small-angle approximation or rather the Taylor series:

$$A \cdot \sin(2\pi \cdot f \cdot t + \phi)$$

$$\approx p_0$$

$$\cdot \sin(2\pi \cdot f_0 \cdot t + \phi_0) + p_1 \cdot 2\pi \cdot t \cdot \cos(2\pi \cdot f_0 \cdot t + \phi_0) + p_2$$

$$\cdot \cos(2\pi \cdot f_0 \cdot t + \phi_0),$$

with $p_0 = A$, $p_1 = A \cdot \Delta f$, $p_2 = A \cdot \Delta \phi$, $f = f_0 + \Delta f$, and $\phi = \phi_0 + \Delta \phi$.

The respective terms $p_0$, $p_1$ and $p_2$ can be estimated for every periodic horizontal impairment component accordingly, wherein $f_0$ and $\phi_0$ are taken from the respective coarse estimation.

Based on the linearization mentioned above, a linear model is constructed for the different time interval errors as follows:

$$\underbrace{\begin{bmatrix} TIE_0 \\ TIE_1 \\ \ldots \\ TIE_N \end{bmatrix}}_{J_{TIE}} =$$

$$\underbrace{\begin{bmatrix} \sin(2\pi \cdot f_0 \cdot t_0 + \phi_0) & 2\pi \cdot t_0 \cdot \cos(2\pi \cdot f_0 \cdot t_0 + \phi_0) & \cos(2\pi \cdot f_0 \cdot t_0 + \phi_0) \\ \sin(2\pi \cdot f_0 \cdot t_1 + \phi_0) & 2\pi \cdot t_1 \cdot \cos(2\pi \cdot f_0 \cdot t_1 + \phi_0) & \cos(2\pi \cdot f_0 \cdot t_1 + \phi_0) \\ \ldots & \ldots & \ldots \\ \sin(2\pi \cdot f_0 \cdot t_N + \phi_0) & 2\pi \cdot t_N \cdot \cos(2\pi \cdot f_0 \cdot t_N + \phi_0) & \cos(2\pi \cdot f_0 \cdot t_N + \phi_0) \end{bmatrix}}_{A}$$

$$\begin{bmatrix} p_0 \\ p_1 \\ p_2 \end{bmatrix}_{p}$$

In the above-mentioned model, $t_k$ is either the CDR timestamp $T(k)$ or the sample time $k \cdot T_S$ depending on the respective model selected previously.

The fine estimation tries to least squares fit the components to the input signal. Hence, a least squares problem can be emerged that reads as follows:

$$p^* = \underset{p}{\operatorname{argmin}} \|A \cdot p - J_{Tie}\|_2^2$$

The respective least squares problem can be solved efficiently by a standard least squares solver such that the model parameters associated with the amplitude, frequency and initial phase can be determined.

Accordingly, the amplitude, the frequency and the initial phase of the respective periodic horizontal impairment component can be estimated in an accurate manner.

In some embodiments, the amplitude is estimated while small changes are performed to the roughly estimated frequency and the roughly estimated phase already obtained by the coarse estimation previously.

In a seventh step S7, the respective periodic horizontal impairment component is reconstructed and subtracted from the input signal.

Figure 4:
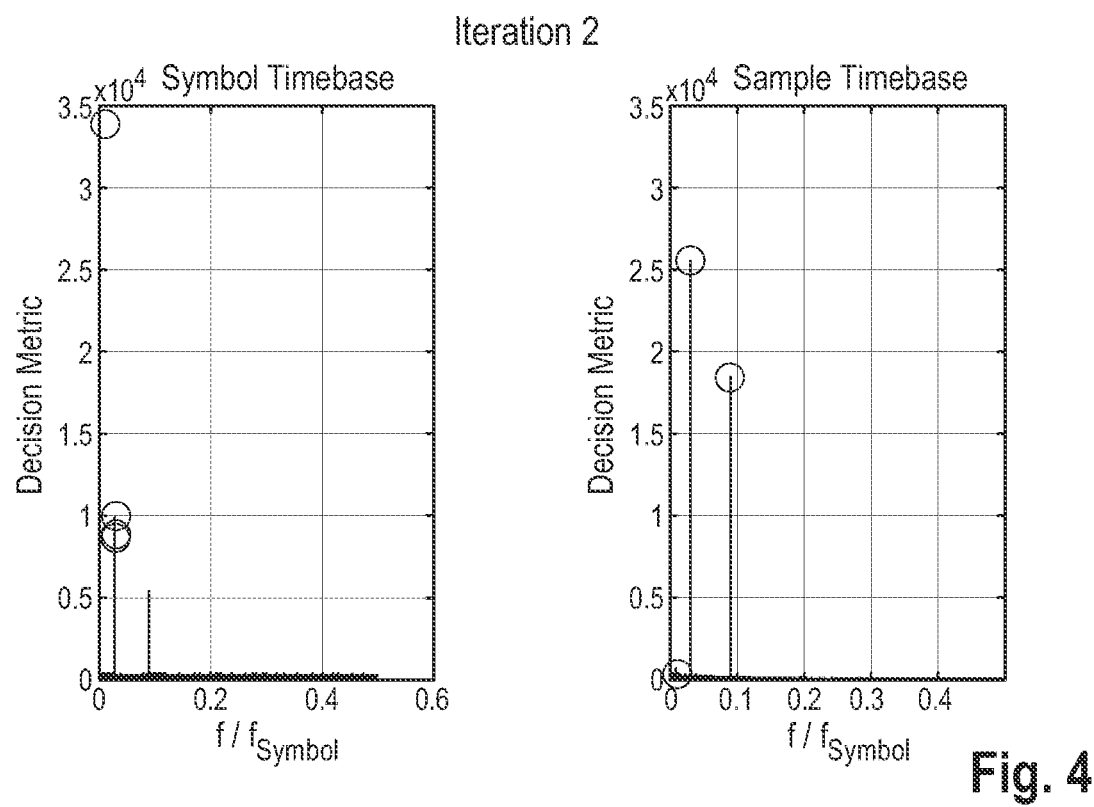
FIG. 4 shows an overview of a coarse estimator decision metrics in a second iteration.
Figure 5:
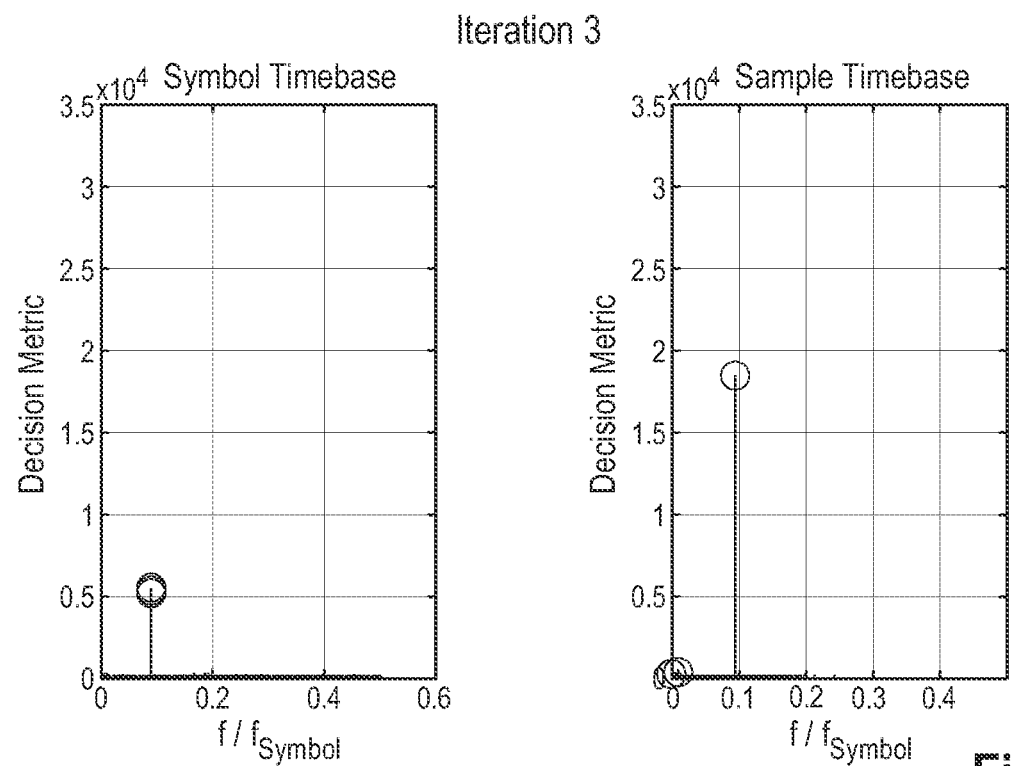
FIG. 5 shows an overview of a coarse estimator decision metrics in a third iteration.
Figure 6:
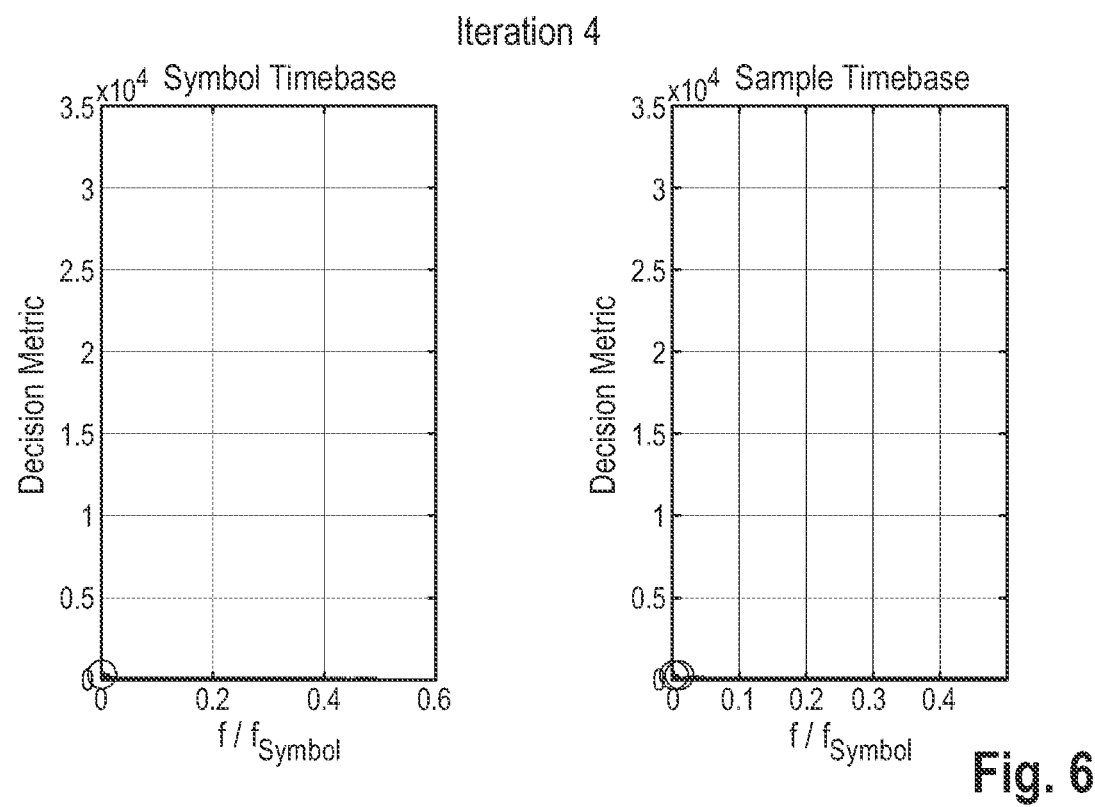
FIG. 6 shows an overview of a coarse estimator decision metrics in a fourth iteration.

In an eighth step S8, the steps mentioned before, namely steps 2 through 7, are repeated for all peaks identified or a subset thereof, resulting in FIGS. 4 to 6 which illustrate the same plots for further iterations, namely after subtracting respective reconstructed periodic horizontal impairment components.

Hence, the largest value in the coarse estimation according to both models is identified in each iteration, wherein a fine estimation using the component identified and its respective model is performed again such that the respective periodic horizontal impairment component can be reconstructed accurately and subtracted from the input signal.

The above-mentioned steps are performed in an iterative manner until no further periodic horizontal impairment component is identified during the coarse estimation or until the required number of components is reached. The final iteration is shown in FIG. 6. In other words, the respective iteration is stopped before it operates on noise only. This condition may be detected independently by the coarse estimation. Hence, no further component is reported.

In some embodiments, the model associated with the analysis chosen and/or the respective source of the periodic horizontal impairment component may be indicated by the measurement instrument 12. In some embodiments, it is displayed on the display 22 such that the user gets informed appropriately. Accordingly, the user is informed whether the source is an intrinsic or an extrinsic one since this information can be automatically derived from the respective model chosen, namely the time base associated with that specific model.

Due to the different models used for the rough estimation, the time basis can be identified and taken into consideration. This improves the accuracy of the reconstruction and, therefore, the jitter and/or noise analysis is improved accordingly.

Moreover, the time base as well as the origin of the horizontal periodic impairment component can be indicated appropriately.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term information can be used interchangeably with the term signal, as generally understood in the art.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of analyzing at least one periodic horizontal impairment component of an input signal, the method comprising:
  receiving the input signal that comprises at least a periodic horizontal impairment component;
  analyzing the at least one periodic horizontal impairment component based on a first model, thereby obtaining a first estimated parameter set for each analyzed periodic horizontal impairment component; and
  analyzing the at least one periodic horizontal impairment component based on a second model, thereby obtaining a second estimated parameter set for each analyzed periodic horizontal impairment component,
  wherein the first model is different to the second model, and
  wherein the first model and the second model are associated with different time bases.

2. The method according to claim 1, wherein the first model is a symbol time based model, and wherein the second model is a sample time based model.

3. The method according to claim 1, wherein it is decided whether the model associated with the first analysis of the at least one periodic horizontal impairment component or the model associated with the second analysis of the at least one periodic horizontal impairment component best meets a pre-defined criterion.

4. The method according to claim 3, wherein the decision is made automatically without any manual input.

5. The method according to claim 3, wherein the pre-defined criterion relates to a maximum value or a minimum value.

6. The method according to claim 3, wherein the model associated with the analysis of the periodic horizontal impairment component is chosen for further processing that best meets the pre-defined criterion.

7. The method according to claim 6, wherein the respective analysis is chosen automatically without any manual input.

8. The method according to claim 6, wherein the model associated with the analysis chosen is at least one of indicated to a user and displayed on a display.

9. The method according to claim 1, wherein a source of the periodic horizontal impairment component is indicated.

10. The method according to claim 9, wherein it is indicated whether the source of the periodic horizontal impairment component is an intrinsic source or an extrinsic source.

11. The method according to claim 9, wherein the source of the periodic horizontal impairment component is derived from the model associated with the respective analysis.

12. The method according to claim 1, wherein the respective analysis comprises a coarse estimation of the periodic horizontal impairment component.

13. The method according to claim 12, wherein the coarse estimation is based on a transform of a time interval error vector.

14. The method according to claim 12, wherein the coarse estimation comprises the step of identifying peaks in a spectrum associated with the input signal, the spectrum being obtained by a transform.

15. The method according to claim 12, wherein the coarse estimation of the periodic horizontal impairment component when applying the second model comprises a resampling step or a non-uniform transform.

16. The method according to claim 1, wherein a fine estimation of the periodic horizontal impairment component is performed.

17. The method according to claim 16, wherein the fine estimation is based on a substitute model that is linearized.

18. The method according to claim 16, wherein a coarse estimation of the periodic horizontal impairment component is performed previously, thereby obtaining at least a roughly estimated frequency and a roughly estimated initial phase of the periodic horizontal impairment component, and wherein the fine estimation takes the roughly estimated frequency and the roughly estimated initial phase of the periodic horizontal impairment component into account in order to determine at least one of an amplitude, a frequency and an initial phase of the periodic horizontal impairment component.

19. The method according to claim 16, wherein the fine estimation is based on a least squares approach.

20. A measurement instrument for analyzing a periodic horizontal impairment component of an input signal, comprising at least one input channel and an analysis circuit being connected to the at least one input channel,
  the measurement instrument being configured to receive an input signal comprising at least a periodic horizontal impairment component via said input channel and to forward the input signal to the analysis circuit;
  the analysis circuit being configured to
    analyze the at least one periodic horizontal impairment component based on a first model, thereby obtaining a first estimated parameter set for each analyzed periodic horizontal impairment component; and
    analyze the at least one periodic horizontal impairment component based on a second model, thereby obtaining a second estimated parameter set for each analyzed periodic horizontal impairment component,
    wherein the first model being different to the second model, and
    wherein the first model and the second model are associated with different time bases.

* * * * *